(12) United States Patent
Hayashi et al.

(10) Patent No.: US 8,657,962 B2
(45) Date of Patent: Feb. 25, 2014

(54) PARTICLE REMOVING METHOD, PARTICLE REMOVING DEVICE, ATOMIC FORCE MICROSCOPE, AND CHARGED PARTICLE BEAM APPARATUS

(75) Inventors: Hiroki Hayashi, Takamatsu (JP); Takashi Konno, Takamatsu (JP); Kouji Iwasaki, Chiba (JP); Masatoshi Yasutake, Chiba (JP); Junichi Tashiro, Chiba (JP)

(73) Assignee: AOI Electronics Co., Ltd., Takamatsu-shi (JP)

( * ) Notice: Subject to any disclaimer, the term of this patent is extended or adjusted under 35 U.S.C. 154(b) by 1160 days.

(21) Appl. No.: 12/139,065

(22) Filed: Jun. 13, 2008

(65) Prior Publication Data

US 2008/0307866 A1    Dec. 18, 2008

(30) Foreign Application Priority Data

Jun. 15, 2007    (JP) .................................. 2007-159230

(51) Int. Cl.
*B08B 7/00*    (2006.01)
(52) U.S. Cl.
USPC ................................................. 134/6; 134/18
(58) Field of Classification Search
None
See application file for complete search history.

(56) References Cited

U.S. PATENT DOCUMENTS

| | | | |
|---|---|---|---|
| 5,086,230 A | 2/1992 | Adachi et al. | |
| 5,406,833 A | 4/1995 | Yamamoto | |
| 5,574,280 A | 11/1996 | Fujii et al. | |
| 5,826,129 A * | 10/1998 | Hasebe et al. | 396/611 |
| 6,777,674 B2 * | 8/2004 | Moore et al. | 850/9 |
| 2002/0158480 A1 | 10/2002 | Nakayama et al. | |
| 2007/0138388 A1 | 6/2007 | Ward et al. | |

FOREIGN PATENT DOCUMENTS

| | | | |
|---|---|---|---|
| JP | 2001-252900 A | | 9/2001 |
| JP | 2003042861 A | * | 2/2003 |
| JP | 2005-84582 A | | 3/2005 |
| JP | 2005-311320 A | | 11/2005 |

* cited by examiner

*Primary Examiner* — Eric Golightly
(74) *Attorney, Agent, or Firm* — Crowell & Moring LLP

(57) ABSTRACT

Small tweezers having a pair of arms openable and closable is moved closer to a sample and grips a particle attached on a surface of the sample and carries it onto an adhesion member to attach it thereto. The small tweezers are opened to release the particle and brought away from the adhesion member to leave the particle on the adhesion member. A particle removing device includes small tweezers having a pair of arms openable and closable; an opening/closing driving unit that drives the arm or arms to open/close the small tweezers; a stage mounting an adhesion member that attaches thereto a particle to withdraw the particle; and a moving mechanism that moves the small tweezers between the sample and the adhesion member mounted on the stage. Also, an atomic force microscope and a charged ion beam apparatus that include the particle removing device are disclosed.

11 Claims, 8 Drawing Sheets

(a) LOWERING (b) SCANNING (c) MOVING/GRIPPING

PARTICLE REMOVING METHOD, PARTICLE REMOVING DEVICE, ATOMIC FORCE MICROSCOPE, AND CHARGED PARTICLE BEAM APPARATUS

INCORPORATION BY REFERENCE

The disclosure of the following priority application is herein incorporated by reference:

Japanese Patent Application No. 2007-159230 (filed Jun. 15, 2007).

Also, the disclosures of the following patent references are incorporated herein by reference:

U.S. Pat. No. 5,406,833; and

U.S. Pat. Nos. 5,086,230, and 5,574,280, and U.S. Patent Application Publication No. 2007/0138388.

BACKGROUND OF THE INVENTION

1. Field of the Invention

The present invention relates to a particle removing method, a particle removing device, an atomic force device, and a charged particle beam apparatus.

2. Description of Related Art

Adhesion of particles in a semiconductor device production process affects the yield and quality of the semiconductor device produced. Particles on the photomask cause post-defects upon exposure. Various methods for removing such particles thus far presented include removing the particles by picking up them with tweezers (see, for example, Japanese Laid-Open Patent Application No. 2005-84582). U.S. Pat. No. 5,406,833 discloses an atomic force microscope. U.S. Pat. Nos. 5,086,230 and 5,574,280 and U.S. Patent Application Publication No. 2007/0138388 disclose focused ion beam devices.

SUMMARY OF THE INVENTION

However, small particles have small weights and hence they tend to adhere to tweezers that grip them due to static charge or cohesion even after the tweezers are released or opened. As a result, the particles do not come off from the tweezers at a predetermined position. This is inconvenient in that when the tweezers with the particles attached thereto are used again and brought close up to an object to be cleaned, i.e., an object from which a particle is to be removed, the particle on the tweezers is attached again to the object to be cleaned.

In a first aspect, the present invention provides a particle removing method, including: relatively moving small tweezers having a pair of arms with respective gripping sections that are openable and closable closer to a surface of a sample and gripping a particle attached on the surface of the sample with the sample gripping sections of the arms; relatively moving the small tweezers gripping the particle onto an adhesion member and having the particle contacted with the adhesion member; and then opening the small tweezers to release the particle and relatively moving the small tweezers away from the adhesion member.

In the first aspect, the method may further include: relatively moving the small tweezers to position the sample gripping section of the small tweezers at a predetermined distance above the surface of the sample before gripping the particle; and when the particle is contacted with the adhesion member, relatively moving the small tweezers to press a lower part of the particle gripped by the sample gripping section of the small tweezers against the adhesion member so that only the particle is attached to the adhesion member.

In the first aspect, the method may further include: scanning the surface of the sample with a tip of the arms to perform atomic microscope observation to obtain image information and detect a position of the particle on the surface of the sample and a height of the particle on the surface of the sample based on the obtained image information; and aligning the small tweezers with the detected position and controlling the height of the sample gripping section from the surface of the sample according to the height of the particle to grip the particle.

In the first aspect, the method may further include: pressing the sample gripping section of the small tweezers against the adhesion member to remove micro dust attached to the sample gripping section before the gripping the particle attached on the surface of the sample with the small tweezers.

In a second aspect, the present invention provides a particle removing method, including: operating a small tweezers having a pair of arms that are openable and closable to close the pair of arms to grip a particle attached on a surface of a sample between the pair of arms; relatively moving the small tweezers gripping the particle to an adhesion member having a surface that allows the particle to be attached thereto by adhesion force to remove the particle from the surface of the sample and have the particle contacted with the adhesion member; and operating the small tweezers to open the pair of arms to release the particle from the small tweezers and relatively moving the small tweezers away from the adhesion member, whereby the particle remains as attached to the surface of the adhesion member.

In the second aspect, the method may further include: adjusting a height of the small tweezers from the surface of the sample.

In the second aspect, the method may further include: upon contacting the particle to the adhesion member, pressing a lower part of the particle to the adhesion member so that only the lower part of the particle is attached to the adhesion member without contacting the small tweezers with the adhesion member.

In the second aspect, the method may further include: scanning the surface of the sample with a tip of the pair of arms of the small tweezers to perform atomic microscope observation to obtain image information and detect a position of the particle on the surface of the sample and a height of the particle on the surface of the sample based on the obtained image information; and aligning the small tweezers with the detected position and controlling the height of the sample gripping section from the surface of the sample according to the height of the particle to grip the particle.

In the second aspect, the method may further include: pressing the sample gripping section of the small tweezers against the adhesion member to remove micro dust attached to the sample gripping section before the gripping the particle attached on the surface of the sample with the small tweezers.

In a third aspect, the present invention provides a particle removing device including: small tweezers having a pair of arms that are openable and closable to release/grip a particle therebetween; an opening/closing driving unit that drives at least one of the pair of arms to open/close; a stage mounting thereon an adhesion member to which the particle is to be attached; and a moving mechanism that relatively moves the small tweezers between the sample and the adhesion member mounted on the stage. The particle on the sample is gripped by closing of the small tweezers, is released by opening of the small tweezers, and is attached to the adhesion member, so that the particle is transferred from the sample onto the adhesion member.

In the particle removing device according to the third aspect, the moving mechanism may be adapted to relatively move the small tweezers to and from the sample in a direction perpendicular to a direction in which the moving mechanism moves the small tweezers between the sample and the adhesion member mounted on the stage.

In the third aspect, the particle removing device may further include: a piezoelectric element that vibrates the small tweezers.

In the particle removing device according to the third aspect, the pair of arms may include a stationary arm and a movable arm integrally formed on a support; and the particle removing device further comprises an optical lever detection system including a laser beam source and a photodiode, adapted to detect deflection of the stationary arm.

In the particle removing device according to the third aspect, the pair of arms may include a stationary arm and a movable arm integrally formed on a support; and the particle removing device may further include a piezoelectric element that resonantly vibrates the stationary arm to enable observation of a shape of the surface of the sample.

In the particle removing device according to the third aspect, the adhesion member may include an adhesive sheet having an adhesive layer.

In the particle removing device according to the third aspect, the adhesive layer may include a material selected from the group consisting of polyurethane, acrylic solvent type pressure-sensitive adhesive, and silicone resin.

In the particle removing device according to the third aspect, the opening/closing driving unit may drive both of the pair of arms to open/close.

In the third aspect, the particle removing device may further include a three-dimensional stage that mounts thereon the sample and the adhesion member. The moving mechanism is adapted to move the three-dimensional stage mounting thereon the sample and the adhesion member to and from the small tweezers.

In a fourth aspect, the present invention provides an atomic microscope including: a particle removing device according to the third aspect of the present invention.

In a fifth aspect, the present invention provides a charged particle beam apparatus including: a particle removing device according to the third aspect of the present invention.

According to the present invention, the removed particles can be transferred from the small tweezers to the adhesion member with high reliability, so that the particles can be prevented from adhering to the sample again via the small tweezers.

DETAILED DESCRIPTION OF THE INVENTION

Hereinafter, preferred embodiments of the present invention are described with reference to the attached drawings.

Figure 1:
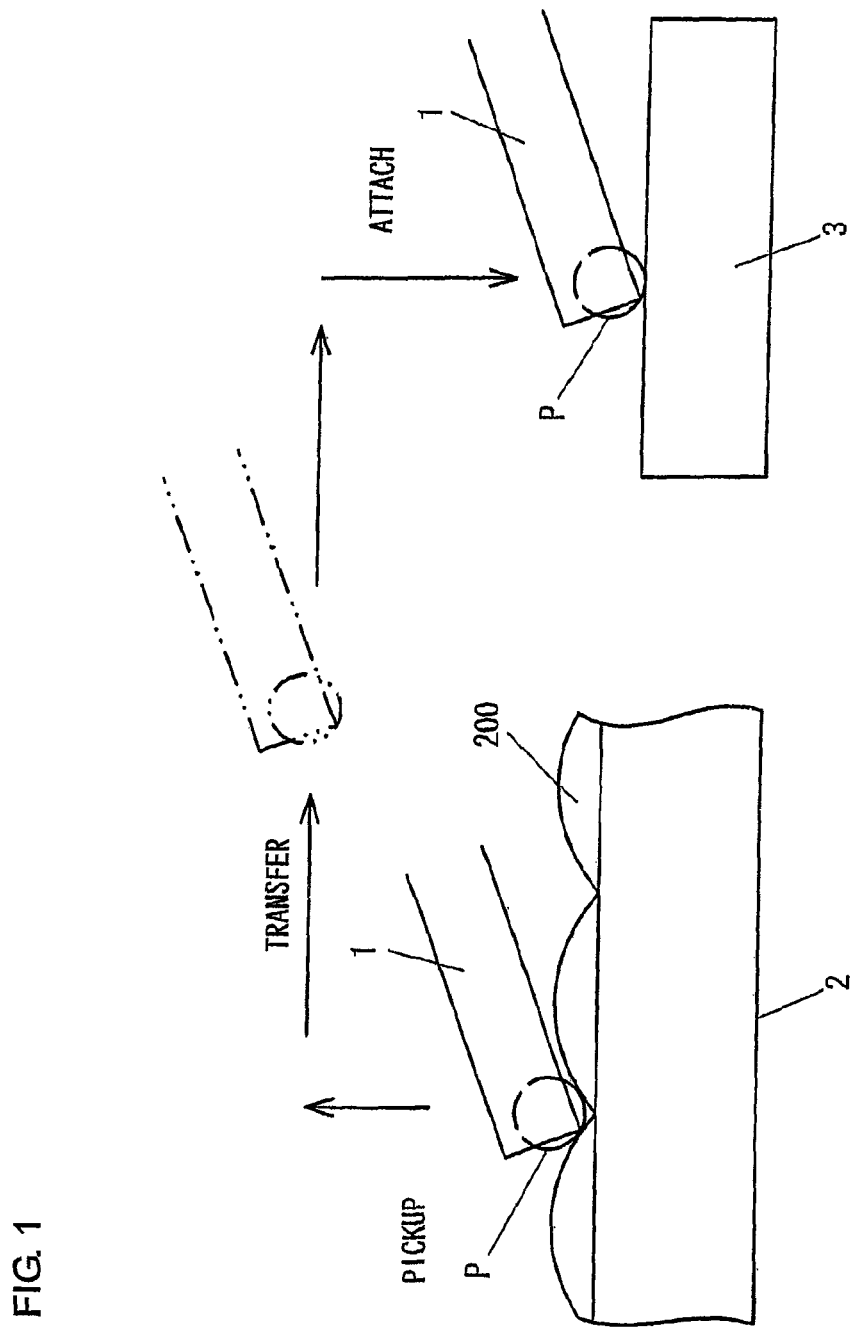
FIG. 1 illustrates a particle removing method according to an embodiment of the present invention.

FIG. 1 illustrates a method of removing particles according to a first embodiment of the present invention. In the first embodiment, particles adhering to the surface of a sample are removed using tweezers that can grip small objects having a size on the order of micrometers or nanometers (hereafter, the tweezers being referred to as "nano tweezers"). The operation of removing particles using nano tweezers is performed in a clean room. FIG. 1 illustrates a method of removing a particle P on a CCD (Charge-Coupled Device) substrate 2. On the CCD substrate 2 is formed an on-chip microlens 200 for each pixel. Heretofore, the particle P has been removed with a cleaning solution. If the surface of the CCD substrate 2 is uneven like the surface of the microlenses 200, the particle P tends to remain in a concaved portion as shown in FIG. 1.

The operation of removing the particle P with nano tweezers 1 (to be detailed later) according to the present embodiment are outlined. The nano tweezers are moved to the position of the particle P. After the height of the nano tweezers 1 is adjusted, the nano tweezers 1 is driven to close to grip the particle P. The nano tweezers 1 with the particle P gripped therewith is moved in air to a position of an adhesion member 3, which is a destination of the particle P. Then the nano tweezers 1 is approached to the adhesion member 3 and the particle P is caused to attach to the adhesion member 3. Thereafter, the nano tweezers are driven to open to release the particle P and moved away from the adhesion member 3. By the series of actions, the particle P is left to be attached to the adhesion member 3 due to adhesive force acting between the particle and the adhesion member 3.

As mentioned above, various methods of gripping the particle P with the tweezers 1 have been presented so far. When the particle P comprised of an inorganic material or an organic material is gripped with the nano tweezers 1 and thereafter the nano tweezers 1 is driven to open, the particle P tends to be left attached to the nano tweezers 1 due to electrostatic force or adhesive force acting between the particle P and the tweezers 1. In particular, when the particle P is comprised of the organic material, the particle P is easily attached to the surface of the nano tweezers 1 because of cohesiveness of the particle P. This causes inconveniences. When the nano tweezers 1 with the particle P attached thereto is approached to the microlens 200 in order to remove another particle P, the particle P attached to the nano tweezers 1 comes to be attached to the microlens 200 again.

In the present embodiment, the particle P gripped by the nano tweezers 1 is attached to an adhesion member separately provided in order to prevent reattachment of the particle P to the microlens 200. Since the particle P removed from the nano tweezers 1 is firmly attached to the surface of the adhesion member because of the adhesive force of the adhesion member 3, inconveniences that could otherwise occur such that the particle P would come off from the adhesion member 3, migrate in the device, and be reattached to one of the microlenses 200 again can be prevented. The adhesion member 3 may be, for example, a substrate having applied thereon an adhesive sheet provided with an adhesive layer. Materials that can be used for the adhesive layer include, for example, a polyurethane or acrylic solvent-type adhesive or a silicone resin.

Figure 2:
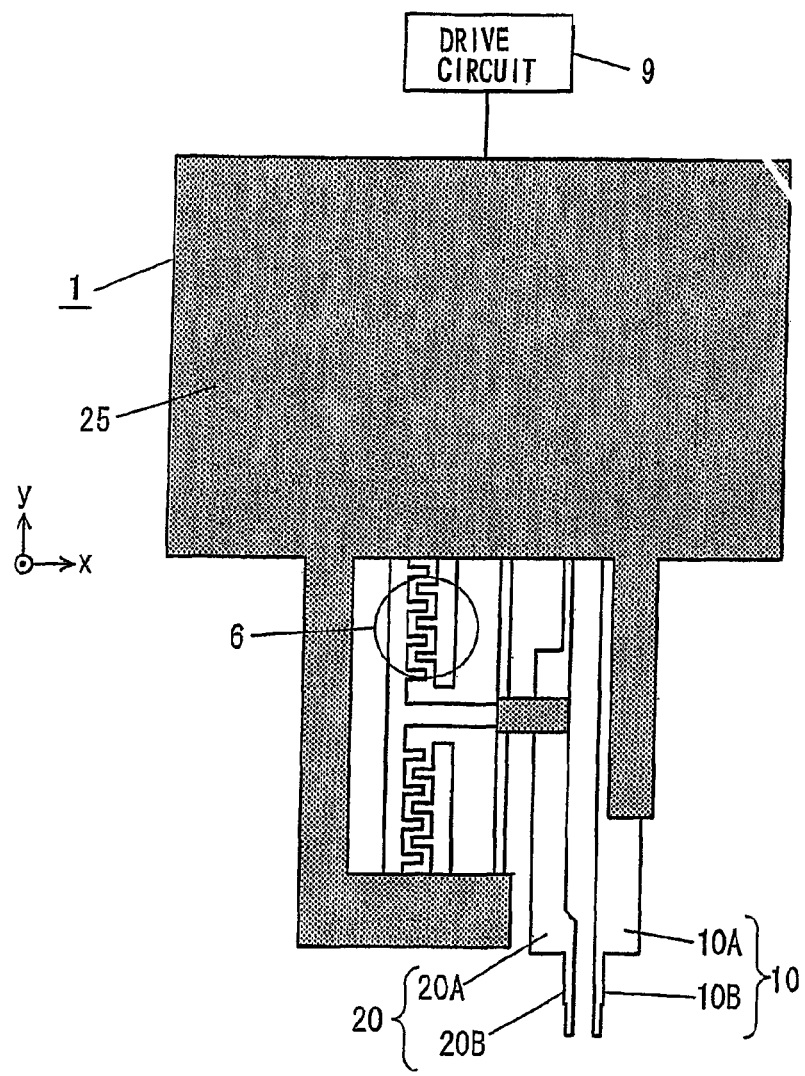
FIG. 2 is a schematic plan view showing an example of a nano tweezers according to an embodiment of the present invention.
Figure 3:
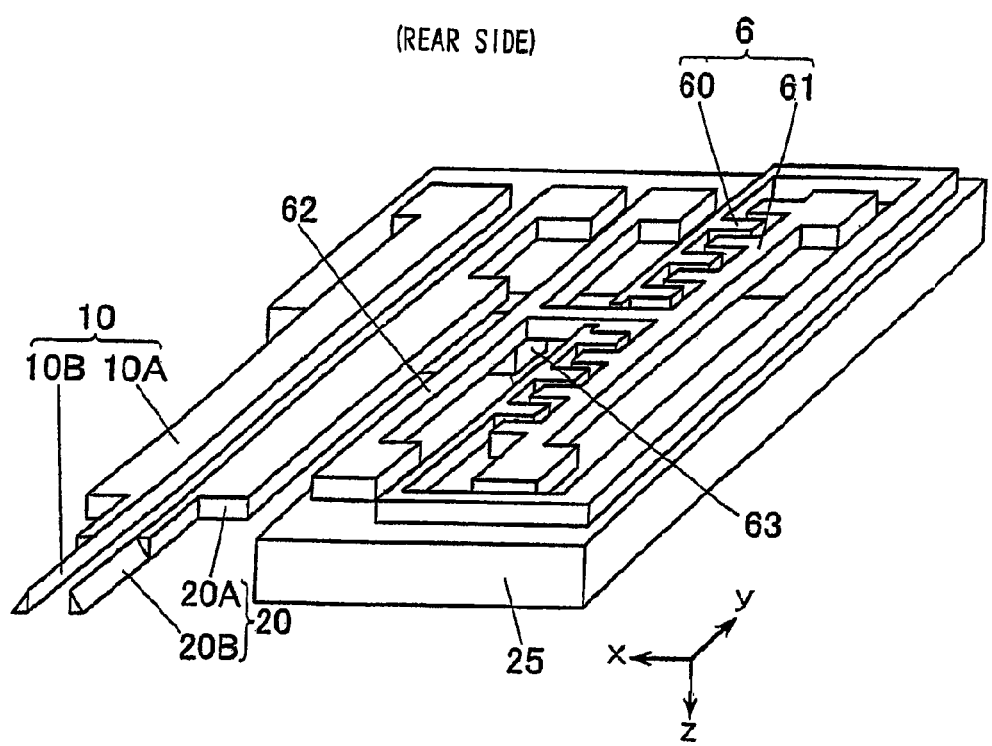
FIG. 3 is a perspective view showing a rear side of the nano tweezers.

FIGS. 2 and 3 show an example of the nano tweezers 1 used for removing particles. FIG. 2 is a plan view of the nano tweezers 1 and FIG. 3 is a perspective view showing the rear side of the nano tweezers 1. The nano tweezers 1 includes a stationary arm 10 and a movable arm 20, both integrally formed on a support 25. The nano tweezers 1 are formed by processing an SOI (Silicon-on-Insulator) substrate by a photolithographic technology. The nano tweezers 1 function not only as tweezers for gripping a sample but also as a cantilever when the stationary arm 10 is used in an observation by AFM (Atomic Force Microscope).

The stationary arm 10 includes a lever 10A and a probe section 10B provided on a tip of the lever 10A. When AFM observation is performed with the nano tweezers 1, the stationary arm 10 is used as an observation probe. The movable arm 20 includes a lever 20A and a gripping section 20B provided on a tip of the lever 20A. The probe 10B and the gripping section 20B are arranged substantially parallel to each other at a predetermined distance from each other.

The movable arm 20 is driven to open and close by an electrostatic actuator 6 in the form of a comb. The electrostatic actuator 6 includes a fixed electrode 60 in the form of a comb fixed on the support 25 and a movable electrode 61 in the form of a comb linked to the movable arm 20. Between the fixed electrode 60 and the movable electrode 61 is applied direct-current arm opening/closing voltage by the drive circuit 9.

The movable electrode 61 is supported on the support 25 by an elastic support section 62. The elastic support section 62 is linked to the movable arm 20 by a linking member 63. With this construction, when arm opening/closing voltage is controlled so as to drive the movable electrode 61 in the x direction, the movable arm 20 is driven in a direction in which the nano tweezers 1 are closed. As a result, a sample, which is present between the probe section 10B and the gripping section 20B, can be gripped by the nano tweezers 1. The probe section 10B and the gripping section 20B are set such that their lengths in the y direction, widths in the x direction, and heights in the z direction are all equal to each other and each of them is of a wedge form tapering off to a point in the −z direction.

The cross-sections of the probe section 10B and the gripping section 20B are each of a rectangular triangle, with front side thereof flat and the rear side thereof sharpened or tapered off as shown in FIG. 3. Opposing gripping surfaces of the probe section 10B and the gripping section 20B are vertical parallel planes, so that they can easily grip the sample therebetween. The sharpened edge of the probe section 10B facilitates AFM observation.

Figure 4:
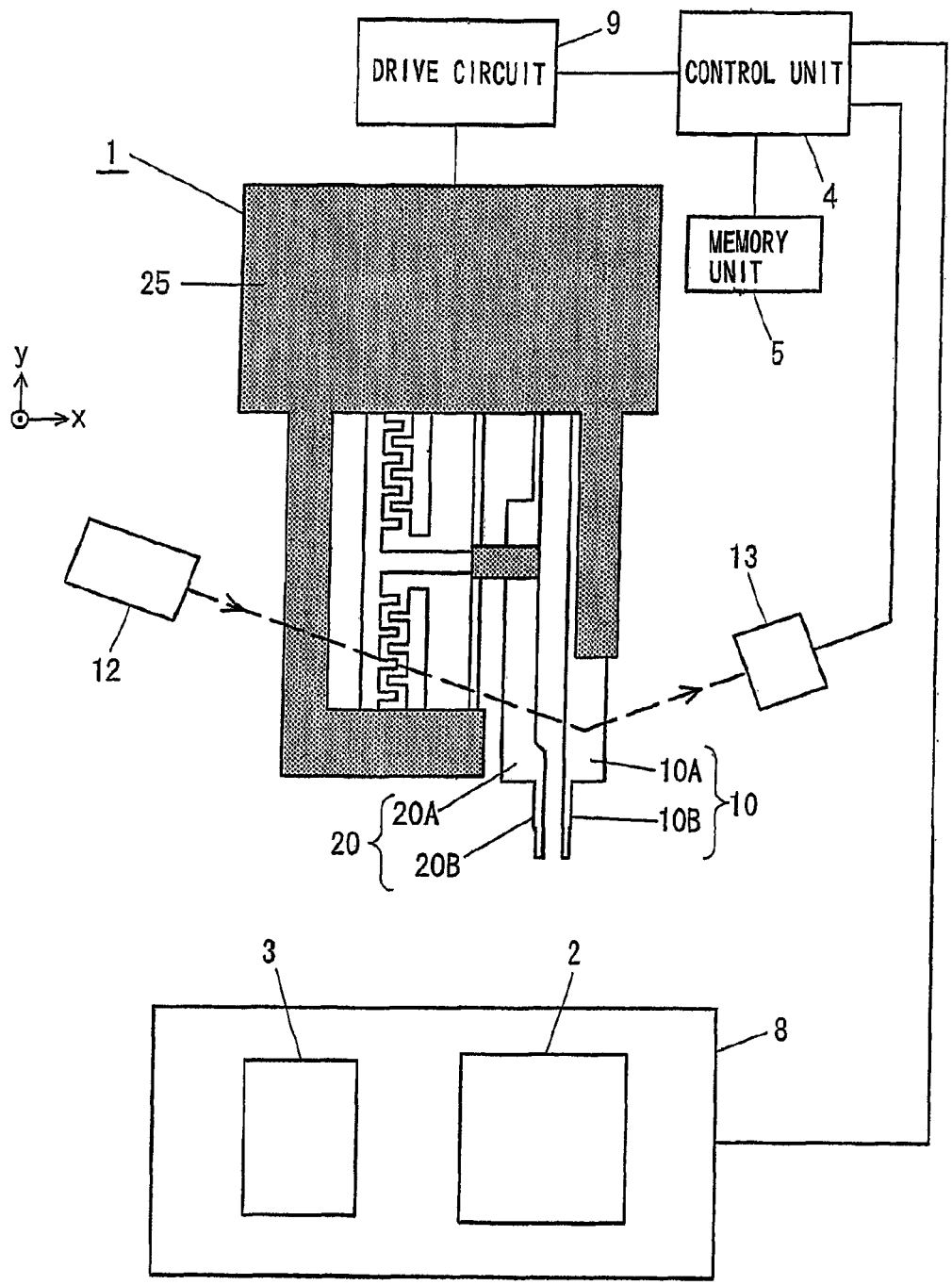
FIG. 4 is a schematic diagram showing a construction of a particle removing device.

FIG. 4 is a diagram showing a whole construction of the particle removing device when particles are removed with the nano tweezers 1. The CCD substrate 2 and the adhesion member 3 are mounted on a three-dimensional stage 8 and driven together in the x, y, and z directions relative to the nano tweezers 1. A laser beam from a laser beam source 12 is irradiated onto an upper surface of the stationary arm 10 to generate reflected light. The reflected light is detected by a photodiode 13.

The photodiode 13 may be a 2-part or 4-part divided photodiode. A detection signal from the photodiode 13 is input into a control unit 4 that controls the particle removing device in whole. The laser beam source 12 and the photodiode 13 constitute an optical lever detection system that detects deformation, more particularly deflection of the stationary arm 13. For example, when the stationary arm 10 contacts the substrate or the like and is further advanced in the z direction, the stationary arm 10 is deflected to some extent and this deflection is calculated based on a detection signal from the photodiode 13.

The position of the particle P on the microlens 200 is measured in advance and the obtained positional information is input to a memory unit 5. The control unit 4 controls the three-dimensional stage 8 and the drive circuit 9 based on the positional information stored in the memory unit 5 to perform particle removing action by the nano tweezers 1.

Figure 5:
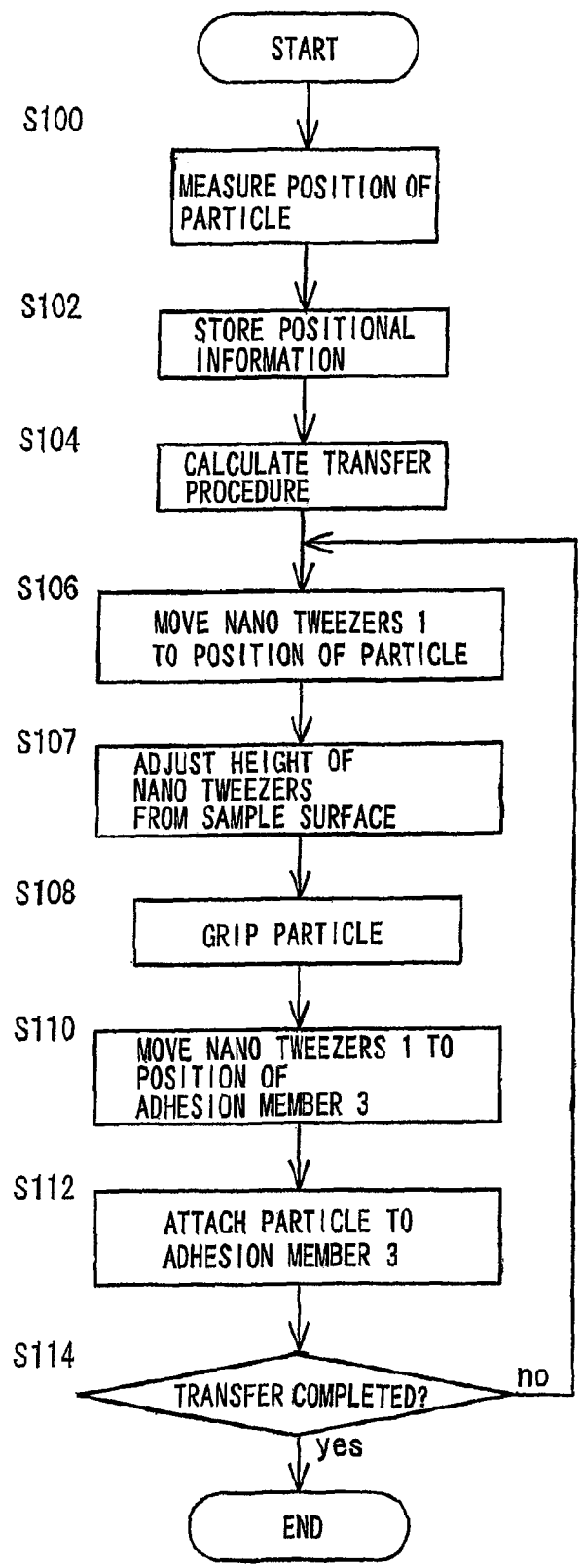
FIG. 5 is a flowchart illustrating a procedure of operations for removing particles.

FIG. 5 is a flowchart illustrating the procedure of particle removing action. In a step S100, the position of particle P on the microlens 200 is measured by a well-known method. For example, a method of detecting laser scattered light is known. According to this method, to perform measurement on a particle on a surface of a wafer, a laser beam is irradiated onto the surface of the wafer so as to be incident obliquely and light scattered by the particle is detected. In a step S102, all the pieces of positional information obtained in the step S101 are stored in the memory unit 5. In a step S104, the control unit 4 calculates, based on the measured positional information of the particle, an order of transfer and a driving procedure of the stage 8 and the nano tweezers 1 upon transfer for each particle and stores the results of the calculations.

Besides the measurement of the position of particles, the position and height of all the particles can be obtained more exactly by obtaining images with AFM. The position and height of all the particles may also be obtained with AFM alone. In any case, an optimal driving procedure concerning all the particles is calculated in advance and when performing a particle removing action, the particles are removed following the order determined by the calculation based on the optimal driving procedure.

In a step S106, the stage 8 is driven according to the transfer procedure calculated in the step S104 to relatively move the nano tweezers 1 to the position of the particle. For example, the stage 8 is driven in the x and y directions so that the nano tweezers 1 is relatively moved to be placed just above the particle. Then the stage 8 is driven in the z direction to relatively lower the tweezers 1 until the nano tweezers 1 contacts the surface of the microlens 200. On this occasion, a deflection of the stationary arm 10 due to the contact is detected by the above-mentioned optical lever detection system. After the contact, the nano tweezers 1 is raised to a position at which the deflection is zero.

In a step S107, the nano tweezers 1 is drawn up by a predetermined distance from a surface of the sample. The predetermined distance is set to, for example, ½ or less of the height of the particle from the surface of the sample.

Thereafter, in a step S108, the movable arm 20 is closed to allow the nano tweezers 1 to grip the particle. In a step S110, the stage 8 is driven to relatively move the nano tweezers 1 gripping the particle to just above a predetermined transfer destination or position on the adhesion member 3. The predetermined transfer position means a transfer position for each particle that is determined in the step S104. For example, an adhesive area of the adhesion member 3 is divided in the form of a lattice and one particle is attached to each of the divided areas.

In a step 112, the nano tweezers 1 is relatively lowered toward the adhesion member 3 until a lower part of the particle is attached to the adhesion member 3. In order to ensure the attachment of the particle to the adhesion member 3, the nano tweezers 1 is relatively lowered until the lower end of the particle contacts the surface of the adhesion member 3 and a deflection of the stationary arm 10 is detected, that is, the lower end of the particle is pressed against the surface of the adhesion member 3. Thereafter, the movable arm 20 is driven to open to cause the nano tweezers 1 to open and the nano tweezers 1 is elevated from the surface of the adhesion member 3. As a result, only the particle P is left on the surface of the adhesion member 3 due to the adhesion between the particle P and the adhesion member 3. By this action, contact of the gripping section on the arm tip with the adhesion member 3 is decreased, so that attachment of the adhesive material to the gripping section on the arm tip is decreased.

Although the nano tweezers 1 is lowered in the direction toward the adhesion member in a closed state, the nano tweezers 1 may be lowered after the nano tweezers 1 is opened. When the nano tweezers 1 is opened, the particle P may fall onto the adhesion member 3 or the particle P may remain as attached to the arm section. When the particle P remains as attached to the arm section 10, the tip of the nano tweezers 1 is pressed onto the surface the adhesion member 3 until it is inserted into the surface in order to further increase the adhesive force to thereby detach the particle from the nano tweezers 1.

Alternatively, the nano tweezers 1 may be vibrated up and down with an piezoelectric element just above the adhesion member 3 to cause the stationary arm 10 formed with the lever 10A and the probe section 10B to resonantly vibrate at an amplitude as large as 100 nm or more, or the movable arm 20 formed with the lever 20A and the gripping section 20B may be opened and closed by the static actuator 6. In this manner, the particles attached to the arms 10 and 20 can be detached.

In a step S114, it is judged whether or not the transfer of all the detected particles to the adhesion member 3 is completed. If it is judged in the step S114 that the transfer is not completed, the process is returned to the step S106 and the nano tweezers 1 is moved to a next particle position. The processing in the steps S106 to S112 is performed to attach a second particle to a second transfer position. When the processing in the steps S106 to S112 is repeatedly performed and all the particles detected are transferred to the adhesion member 3, it is judged in the step S104 that the transfer is completed and thus a series of processing concerning transfer action is completed.

A particle removing device having nano tweezers according to a second embodiment is described below.

In the above-mentioned first embodiment, the position of the particle on the substrate is measured by a measuring device in advance and the nano tweezers 1 is moved based on the result of the measurement. When the probe section 10B of the stationary arm 10 comes closer to the surface of the substrate, the stationary arm 10 is deflected toward the substrate due to force that acts between the probe section 10B and the surface of the substrate. In the device shown in FIG. 4, the deflection deformation of the stationary arm 10 can be detected by the optical lever detection system. Therefore, by operating a Z-servo system (see FIG. 7 to be detailed below) in order to scan the surface of the substrate in the directions of X and Y with the probe section 10B so that the detected deflection becomes constant, unevenness of the surface of the substrate can be detected.

Figure 7:
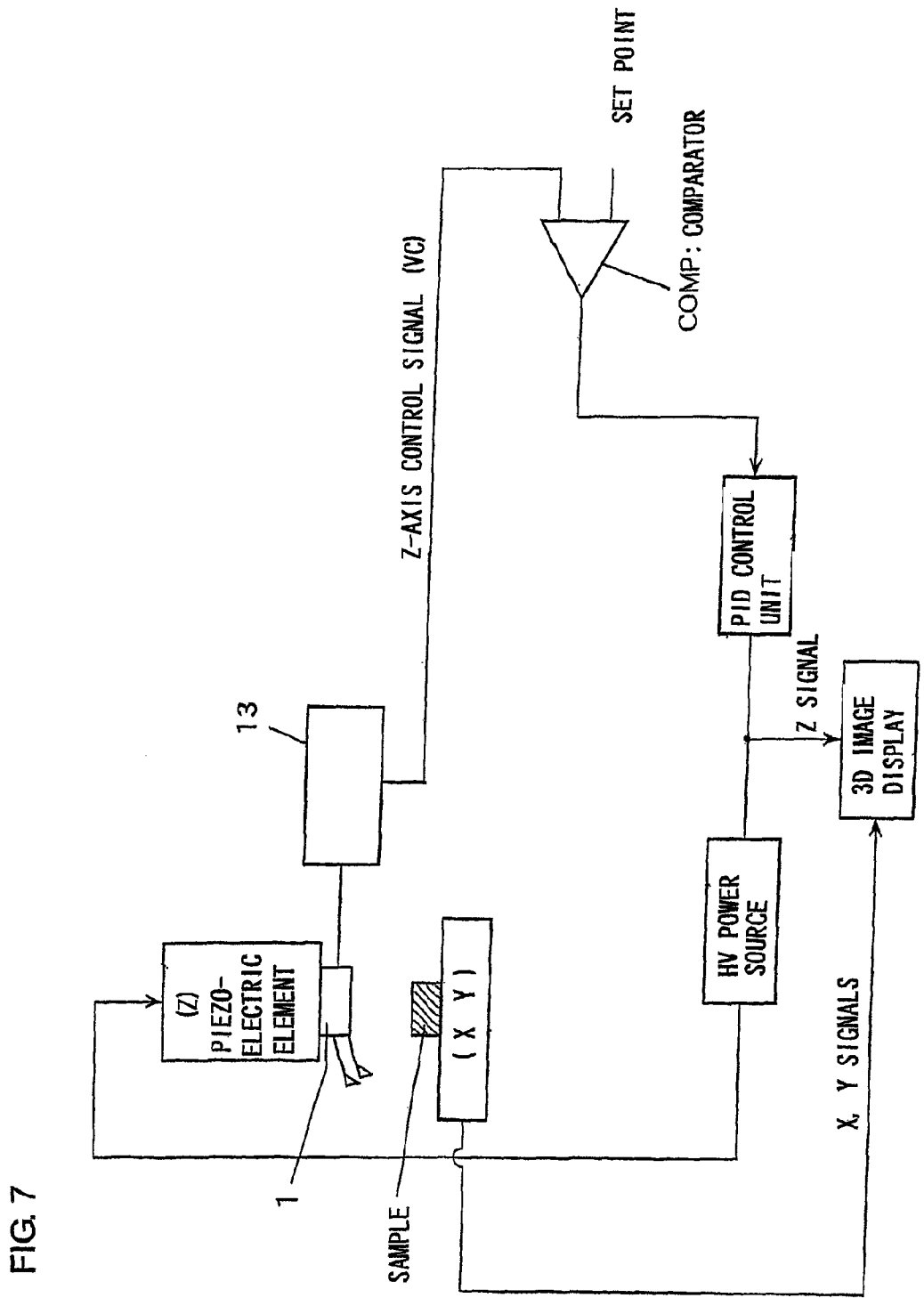
FIG. 7 is a schematic diagram illustrating a Z-servo system.

In the Z-servo system shown in FIG. 7, a Z-axis control signal (Vc) based on the detection signal from the photodiode 13 is input into a comparator COMP where the Z-axis control signal (Vc) is compared with a predetermined set point value. Thereafter, the nano tweezers 1 is driven in the z direction by the piezoelectric element through a PID (Positional-Integral-Derivative) controller and a HV (High Voltage) power source.

In the second embodiment, the stationary arm 10 is used as a probe to detect particles. For example, when only a rough position of a particle is known because of low detection accuracy of the measurement device, a predetermined area that includes the position detected by the measurement device may be scanned by the probe section 10B of the stationary arm 10 in order to obtain an exact position of the particle.

Figure 6A:
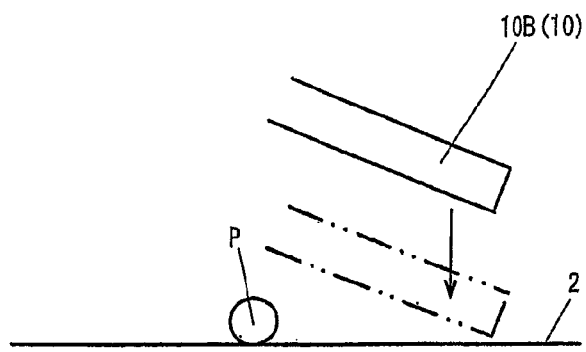
FIG. 6A is a schematic diagram illustrating a lifting operation in a sequence from detection to gripping of a particle P by the nano tweezers.
Figure 6B:
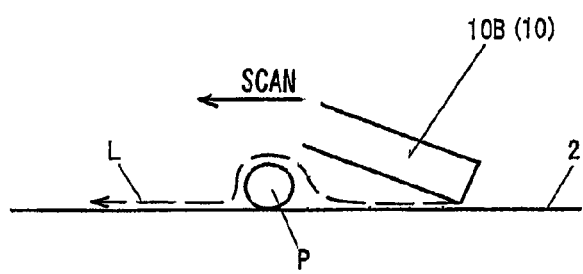
FIG. 6B is a schematic diagram illustrating a scanning operation in the sequence from the detection to the gripping of a particle P by the nano tweezers.
Figure 6C:
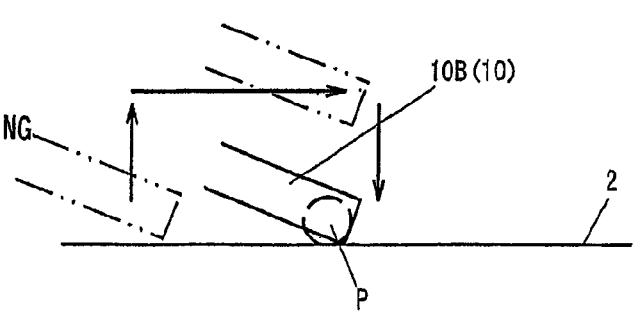
FIG. 6C is a schematic diagram illustrating a moving/gripping operation in the sequence from the detection to the gripping of a particle P by nano tweezers.

FIGS. 6A through 6C illustrate a series of actions from detection of the particle P to gripping it. As shown in FIG. 6A, the nano tweezers 1 is lowered until the probe section 10B of the stationary arm 10 contacts the surface of the substrate 2. In the same manner as in the first embodiment, this contact is detected by detecting the deflection of the stationary arm 10 by the optical lever detection system.

Thereafter, as shown in FIG. 6B, the surface of the substrate 2 is scanned by the probe section 10B in such a manner that the deflection of the stationary arm 10 becomes constant. If the particle P is present on the surface of the substrate 2 during the scanning, a locus of the tip of the probe section 10B is of the form shown in a broken line L. From the results of scanning, the position of the particle P is obtained and the nano tweezers 1 is moved as shown in FIG. 6C so as to contact the surface of the substrate again such that the deflection of the stationary arm 10B of the nano tweezers 1 becomes constant again. Thereafter, the nano tweezers 1 is elevated such that the probe section 10B is at a predetermined distance (for example, h/2 where his the height of the particle) from the surface of the sample and the z servo system is fixed to grip the particle P.

Although in this embodiment, the deflection of the stationary arm 10 is detected by the optical lever detection system, it would also be acceptable to provide the stationary arm 10 with a piezoelectric element to enable detection of the deflection to be performed based on voltage that is generated in the piezoelectric element. In the above-mentioned embodiment, the shape of the surface of the substrate is measured in a contact mode. However, the measurement of the shape of the surface of the substrate may be performed in a dynamic force mode. That is, the shape of the surface may be observed by causing resonant vibration of the stationary arm 10 to occur with the piezoelectric element and performing scanning of the surface of the sample in the x and y directions while controlling the Z servo system such that changes in resonant vibration conditions (amplitude, frequency, and phase) are constant.

According to the above-mentioned embodiment, the gripped particle is attached to the adhesion member 3, so that the particle P is prevented from remaining as attached to the nano tweezers 1. As a result, reattachment of the particle from the nano tweezers 1 to the substrate 2 can be prevented and the particle P attached to the substrate 2 can be removed efficiently and reliably.

In the above-mentioned embodiment, the deflection of the stationary arm 10 is detected with the optical lever detection system or the like to detect the contact of the stationary arm 10 with the surface of the substrate 2 or the surface of the adhesion member 3, and the movement of the nano tweezers 1 in the z direction is controlled. Besides the above-mentioned type of controlling method, it would also be acceptable to control the movement of the nano tweezers 1 in the z direction as follows. That is, the z position of the nano tweezers 1 is aligned with respect to a reference plane for the z-position while observing the nano tweezers 1 with, for example, a microscope in advance, and the movement of the nano tweezers 1 in the z direction is controlled based on a relative position of the nano tweezers 1 with respect to the reference plane for the z-position. While the arm 20, which is one of the arms of the nano tweezers 1, is driven to open and close and the arm 10 used for the detection of particles is set in a stationary state, the present invention is also applicable to nano tweezers of the type in which both the arms 10 and 20 are driven to open and close.

While the substrate 2 and the adhesion member 3 are mounted on the three-dimensional stage 8 and the stage 8 together with the substrate 2 and the adhesion member 3 is moved in the x, y, and z directions with respect to the nano tweezers 1, it would also be acceptable to move the nano tweezers 1 with the three-dimensional stage 8 with respect to the substrate 2 and the adhesion member 3. However, in the construction in which the nano tweezers 1 gripping the particle is moved with the stage 8, there is a possibility that the particle gripped by the nano tweezers 1 could be dropped when the three-dimensional stage 8 is accelerated or decelerated. Therefore, it is preferred that the substrate 2 and the adhesion member 3 are moved by the three-dimensional stage 8 as carried thereon.

The above-mentioned particle removing processes and the particle removing device can be employed in a scanning electron microscope or a charged particle beam apparatus such as a focused ion beam apparatus equipped with a particle removing device having nano tweezers. Reference may be made to, for example, U.S. Pat. No. 5,406,833; and U.S. Pat. Nos. 5,086,230 and 5,574,280 and U.S. Patent Application Publication No. 2007/0138388 for basic constructions of the scanning electron microscope and the focused ion beam, respectively.

Figure 8:
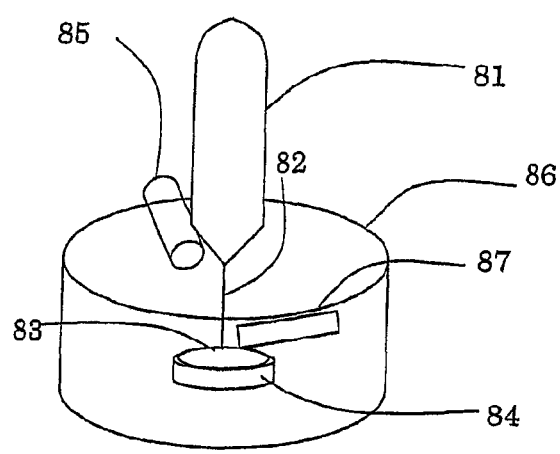
FIG. 8 is a schematic perspective view illustrating a focused ion beam apparatus equipped with the particle removing device according to an embodiment of the present invention.

FIG. 8 shows a focused ion beam apparatus equipped with the particle removing device having nano tweezers according to one of the embodiments of the present invention. An ion beam apparatus 80 includes a focused ion beam barrel 81 that emits a focused ion beam 82 and a vacuum chamber 86 connected to the focused ion beam barrel 81. In the vacuum chamber 86 are arranged a sample stage 84 on which a sample 83 is placed. A particle removing device having nano tweezers device 87 that includes the nano tweezers 1 (for example, FIG. 2) is arranged in the vicinity of the sample stage 84. When the focused ion beam 82 is irradiated from the focused ion beam barrel 81 onto the sample 83 mounted on the stage 84 to scan it, secondary electrons are generated on a surface of the sample 83. The generated secondary electrons are detected by a secondary electron detecting unit 85 to create a secondary electron signal. A secondary electron image on the surface of the sample 83 can be obtained from the detected secondary electron signals. When the particle removing device having nano tweezers 87 is operated in the vicinity of the sample 83, the operation can be monitored through the secondary electron image, so that the particle removing device having nano tweezers 87 can be operated more exactly.

In the above-mentioned embodiments, the minute tweezers may be preliminarily cleaned before gripping the particle therewith. More particularly, after the calculation of the transfer procedure in the step S104 (FIG. 5), or after a negative judgment is made on completion of the transfer and the process is returned to the step S106, and before the nano tweezers 1 are actually moved to the position of the particle, the nano tweezers 1 are moved to the adhesion member 3 and contacted therewith to transfer dust, dirt, and the like, if any, to the adhesion member 3. Thus, the nano tweezers 1 are cleaned. Then, the cleaned nano tweezers 1 are moved to the position of the particle in the step S106 and the subsequent operations are performed in the same manner as in the above-mentioned embodiments. As a result, the sample can be made much cleaner.

The probe section 10B and the gripping section 20B may constitute a sample gripping unit, the electrostatic actuator 6 may constitute an opening/closing driving section, and the three-dimensional stage 8 may constitute a moving mechanism.

What is explained above is only exemplary and the present invention is not limited to the above-mentioned embodiments and variations.

The above described embodiments are examples and various modifications can be made without departing from the scope of the invention.

What is claimed is:

1. A method for removing a particle attached on a surface of a sample to be cleaned, the method comprising:
providing nano tweezers having a pair of arms with respective gripping sections that are openable and closable to open and close the tweezers, and providing an adhesion member placed separately from the sample to be cleaned; wherein
the pair of arms comprises a first arm and a second arm integrally formed on a support, such that one end of each of the first and second arms is fixed to the support and the other end of each of the first and second arms is free,
the first arm is connected through a connecting member with an electrostatic actuator arranged on the support, and moves with respect to the second arm when driven by the electrostatic actuator to close or open the arms, which in turn closes or opens the nano tweezers with a mechanical force transmitted from the electrostatic actuator to the first arm through the connecting member, and
the adhesion member is arranged on a stage;
moving the arms of the nano tweezers toward the surface of the sample to be cleaned and gripping the particle attached on the surface of the sample with the gripping sections of the arms by closing the gripping sections;
moving the arms of the nano tweezers gripping the particle onto the adhesion member such that the particle contacts the adhesion member;
opening the gripping sections of the arms of the nano tweezers to release the particle from the nano tweezers while the particle is held on the adhesion member, and
moving the nano tweezers away from the adhesion member to leave the particle on the adhesion member, thereby cleaning the surface of the sample.

2. A method according to claim 1, further comprising:
moving the arms of the nano tweezers to position the gripping section of the nano tweezers at a predetermined distance above the surface of the sample before gripping the particle; and
when the particle is contacted with the adhesion member, moving the arms of the nano tweezers to press a lower part of the particle gripped by the gripping section of the nano tweezers against the adhesion member so that only the particle is attached to the adhesion member.

3. A method according to claim 1, further comprising:

scanning the surface of the sample with a tip of the arms to perform atomic microscope observation to obtain image information and detect a position of the particle on the surface of the sample and a height of the particle on the surface of the sample based on the obtained image information; and aligning the arms of the nano tweezers with the detected position and controlling the height of the gripping section from the surface of the sample according to the height of the particle to grip the particle.

4. A method according to claim 1, further comprising:

pressing the gripping section of the nano tweezers against the adhesion member to contact micro dust attached to the gripping section with the adhesion member, and moving the arms of the nano tweezers away from the adhesion member that holds the micro dust to clean the gripping sections prior to gripping the particle attached on the surface of the sample with the nano tweezers.

5. A method for removing a particle from a surface of a sample to be cleaned, comprising:

operating nano tweezers having a pair of arms that are openable and closable to close the pair of arms to grip a particle attached on a surface of a sample between the pair of arms; wherein the pair of arms comprises a first arm and a second arm integrally formed on a support, such that one end of each of the first and second arms is fixed to the support and the other end of each of the first and second arms is free, the first arm is connected through a connecting member with an electrostatic actuator arranged on the support, and moves with respect to the second arm when driven by the electrostatic actuator to close or open the arms, which in turn closes or opens the nano tweezers with a mechanical force transmitted from the electrostatic actuator to the first arm through the connecting member, and the adhesion member is arranged on a stage;

moving the arms of the nano tweezers gripping the particle to an adhesion member having a surface that allows the particle to be attached thereto by adhesion force such that the particle contacts the adhesion member; and operating the nano tweezers to open the pair of arms to release the particle that is held by the adhesion member from the nano tweezers, and moving the arms of the nano tweezers away from the adhesion member that holds the particle, thereby cleaning the surface of the sample.

6. A method according to claim 5, further comprising:

adjusting a height of the arms of the nano tweezers from the surface of the sample.

7. A method according to claim 6, further comprising:

upon contacting the particle with the adhesion member, pressing a lower part of the particle to the adhesion member so that only the lower part of the particle is attached to the adhesion member without contacting the gripping sections of the nano tweezers with the adhesion member.

8. A method according to claim 6, further comprising:

scanning the surface of the sample with a tip of the pair of arms of the nano tweezers to perform atomic microscope observation to obtain image information and detect a position of the particle on the surface of the sample and a height of the particle on the surface of the sample based on the obtained image information; and aligning the arms of the nano tweezers with the detected position and controlling the height of the gripping section from the surface of the sample according to the height of the particle to grip the particle.

9. A method according to claim 5, further comprising:

pressing the gripping section of the nano tweezers against the adhesion member to contact micro dust attached to the gripping section with the adhesion member, and moving the arms of the nano tweezers away from the adhesion member that holds the micro dust to clean the gripping sections prior to gripping the particle attached on the surface of the sample with the nano tweezers.

10. A method according to claim 1, further comprising:

detecting deflection of the second arm.

11. A method according to claim 10, wherein the second arm is resonantly vibrated by a piezoelectric element to enable observation of a shape of the surface of the sample.

* * * * *